United States Patent [19]

Fukuoka

[11] 4,032,611

[45] June 28, 1977

[54] METHOD OF MANUFACTURING A FOOTWEAR

[76] Inventor: Tatsuo Fukuoka, No. 3, 3-Ban, 2-Chome, Shin-Minami-Fukushima, Tokushima, Japan

[22] Filed: July 28, 1975

[21] Appl. No.: 599,325

[30] Foreign Application Priority Data

Apr. 30, 1974 Japan .............. 50-53034

[52] U.S. Cl. .................. 264/244; 425/119; 249/95; 425/129 S; 264/273; 264/275
[51] Int. Cl.² ............. B29F 1/00; B29C 6/04
[58] Field of Search .......... 429/119, 129 S, 123, 429/127, 128, 129 R, 468; 249/83, 95; 264/244

[56] References Cited

UNITED STATES PATENTS

| | | | |
|---|---|---|---|
| 3,421,183 | 1/1969 | Grimmeisen | 425/119 |
| 3,500,502 | 3/1970 | Santelmann | 425/119 |
| 3,510,912 | 5/1970 | Lane | 425/119 |
| 3,551,956 | 1/1971 | Dosier | 249/95 X |
| 3,574,895 | 4/1971 | McIlvin | 425/119 |
| 3,590,449 | 7/1971 | Whitley | 249/83 X |
| 3,677,678 | 7/1972 | Christie et al. | 425/119 |
| 3,840,310 | 10/1974 | Klee et al. | 425/119 |

Primary Examiner—J. Howard Flint, Jr.

[57] ABSTRACT

In a method for manufacturing a footwear comprising placing in a mold assembly a preformed section of appropriate material forming part of the footwear in such a manner that a part of said preformed section protrudes into a molding cavity for molding another section of said footwear, injecting molding material into said cavity and thereby integrally connecting said preformed section with the latter section, an improvement comprising surely holding said protruded part of said preformed section in place in said molding cavity by means of a plurality of projections integrally extended from said mold assembly into said molding cavity.

2 Claims, 20 Drawing Figures

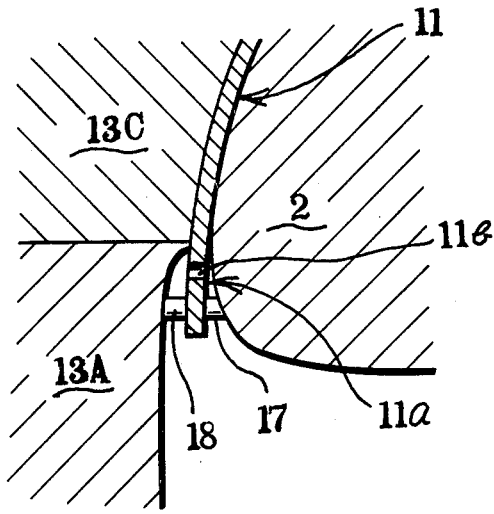
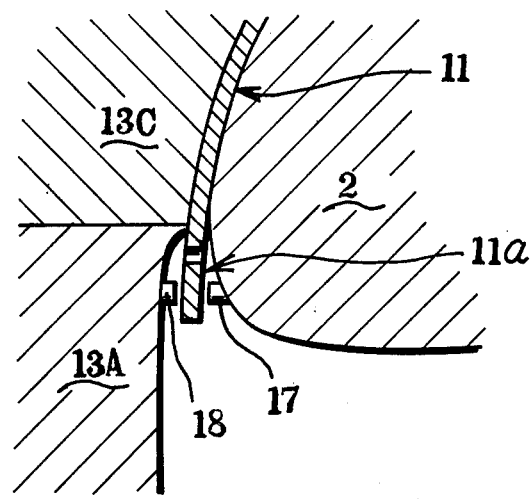
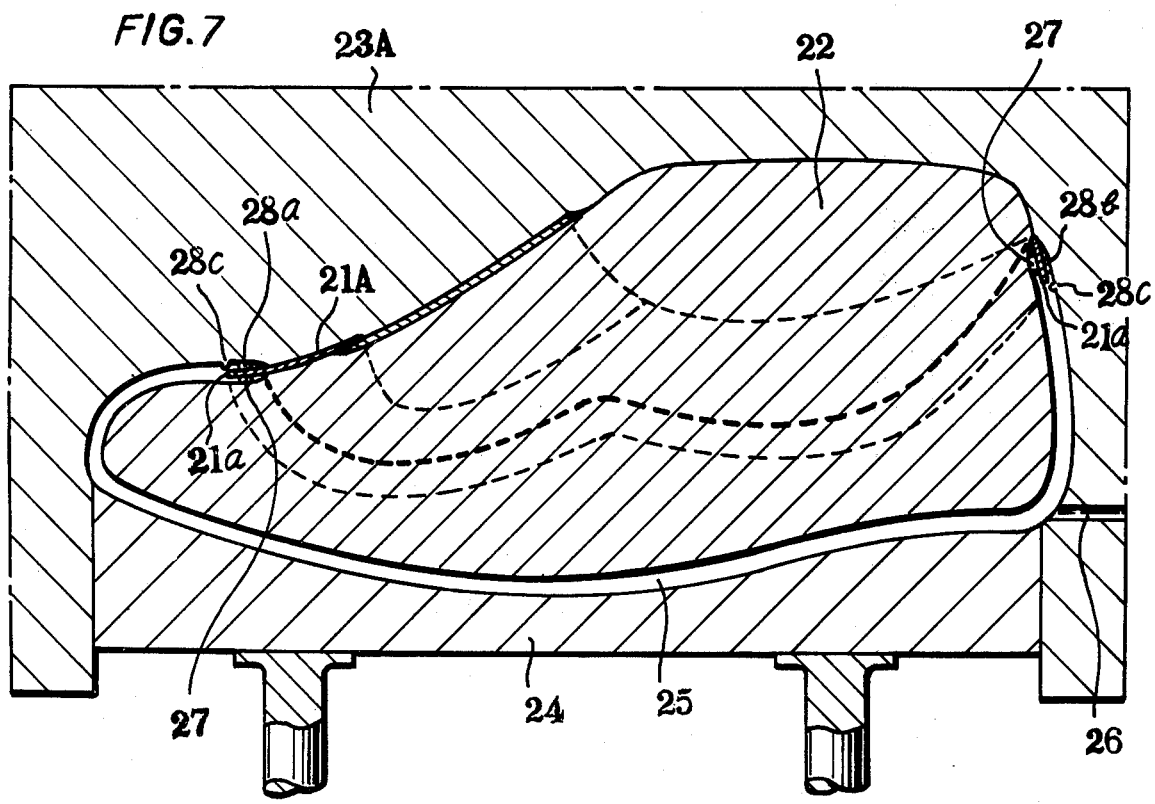

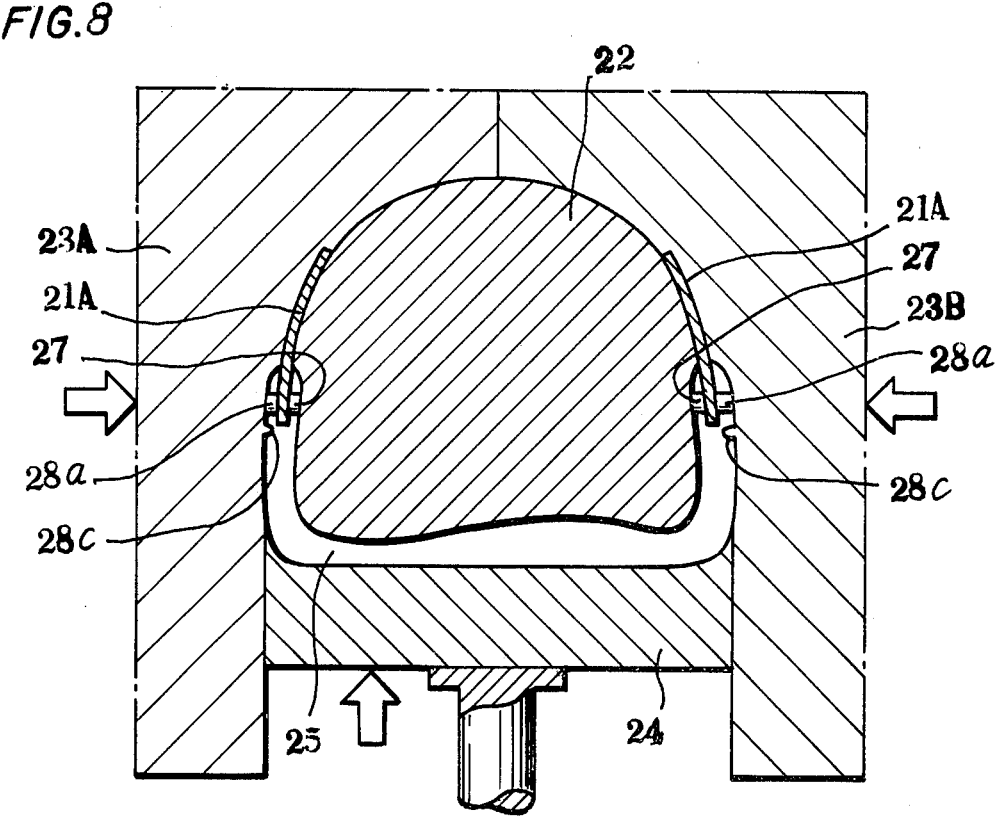
FIG. 8
FIG. 9
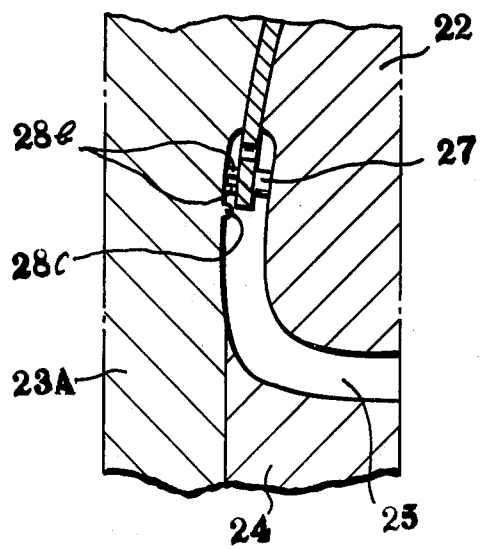
FIG. 10
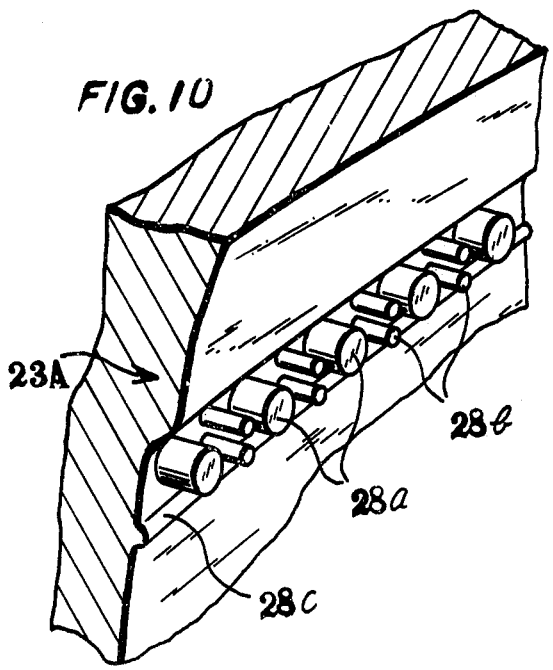

METHOD OF MANUFACTURING A FOOTWEAR

The present invention relates to a method for manufacturing a footwear. It relates particularly to a method for manufacturing a footwear comprising placing in a mold assembly a preformed section of appropriate material forming a part of the footwear in such a manner that a part of said preformed section protrudes into a molding cavity for molding another section of the footwear, injecting molding material into said cavity and thereby integrally connecting the preformed section with the latter section, in which the said part protruded into the cavity is surely held in place during molding whereby the footwear product can be improved in quality and at the same time provided with decorative effects at its connecting portion between the former and latter sections.

As shown in FIG. 1 of the appended drawing, the conventional method for manufacturing e.g. a sandal comprises mounting a band 1 formed of natural or synthetic leather or other soft material on a mold 2, with the lower end 1a of the band protruded into a sole molding cavity 5 defined by a male mold 2, female molds 3A and 3B and a bottom mold 4, injecting molding material such as P.V.C. through an injection opening 6 into the said molding cavity 5, and thereby obtaining a molded sole and at the same time integrally connecting the band with the said sole. In this method, which resin is injected into the cavity, the protruded end 1a of the band 1 is apt to be moved under the pressure of the injected molten resin or, for example, displaced from the predetermined position as shown in FIG. 2, so that the band 1 is inadequately deformed, the connecting portion is weakened and the end portion 1a is partly exposed through the outer surface of the sole, resulting in bad appearance of the product.

Further, in case of a shoe, an upper is usually devided into a plurality of sections such as an upper vamp section and a lateral side section, and similarly to the case of a sandal, the said sections are connected together in such a manner that a preformed section is pressedly connected with other sections in molding said other sections. And in this case, the abovementioned problems arise.

The main object of the present invention is to surely hold a part of a preformed section protruded into a molding cavity at a predetermined position therein so as to obtain an excellent connecting portion, and thus to provide a footwear of high quality.

The connecting portions in a footwear comprising a plurality of sections, especially connecting portions in an upper of a shoe are important points not only in view of its structure but also in view of its appearance, and therefore they are made prominent by providing special decoration.

The known typical decoratively connecting method comprises seaming the connecting portions together with decorative thread, that is, in which decorative effect is obtained by passing a thread through preliminarily provided perforation or by providing seaming pattern, perforations and coloration. Where a string of thread is sufficient for obtaining durability in connecting portion, some seams and another decoration between the seams are provided so as to make the connecting portion decoratively prominent. From this fact it can be said that the connecting portion of a shoe upper is to be not only firmly reinforced by provided with prominently decorative design. However, such a seaming process requires much time and skilled labor, thus resulting in high cost of a product obtained. Therefore such a seaming process is not preferable for mass-producing footwears.

Another important object of the present invention is to provide a method by which perforation is effected on the connecting portions of sections of a footwear so as to afford to manufacture the footwear at a low cost.

A method for manufacturing a footwear according to the present invention comprises placing a preformed section of the footwear in such a manner that a part of the said preformed section protrudes into a molding cavity for molding another section, injecting molding material into the said molding cavity and thereby integrally connecting the said sections together, in which the protruded part of the said preformed section is held in a required position by means of projections integrally extending from the said mold into the said molding cavity.

According to the present invention, the protruded part of the preformed section, which is held in place by the projections as abovementioned, is prevented from being displaced from the predetermined position in the cavity whereby defective products decrease. The projections may bear against the protruded part of the preformed section, or may be spaced from the latter to such a small extent as not to provide defective connection between the sections.

By means of such projections, through holes (when the projections bear against at least the outer surface of the protruded part) or blind holes (when the projections do not reach at least the outer surface of the protruded part) are formed. Through the holes, the outer surface of the protruded part of the preformed section or the inner surface of another section molded in the molding cavity is partly exposed, whereby decorative effect is obtained. Such decoration is made more sufficient by forming the projections according to a special design and arranging well the colors of the molded section and the section to be exposed through the holes.

According to the present invention, when the protruded part of the preformed section in the molding cavity substantially bears against the male mold defining the molding cavity, only one surface of the protruded part has only to be supported by the projections extending only from the female mold. But when the protruded part is spaced to some extent from both of the male and female molds, it is necessary to support both of the two opposite surfaces of the protruded part by the projections extending from the male and female molds respectively in the opposite directions.

Further, according to the present invention, the preformed section may be mounted directly on the male or female mold or mounted on the male mold through the medium of a preformed lining material for forming a lining of the shoe.

Further, according to the present invention, the preformed section comprises natural or synthetic leather, natural or synthetic rubber, cloth, synthetic resin material or the like, while sections to be connected with said preformed section are molded of molding material such as natural or synthetic rubber or suitable synthetic resin.

Other features and advantages of the present invention will be apparent from the following description of the embodiments thereof given with reference to the appended drawings, in which:

FIG. 5(a) is a partly enlarged section of the mold assembly of FIG. 3;

FIG. 5(b) is a section similar to FIG. 5(a), but projections not being in contact with the protruded part;

FIG. 7 is a longitudinal section of the mold assembly holding therein the upper of FIG. 6;

FIG. 8 is a cross section of the molds of FIG. 7;

FIG. 9 is a partly enlarged view of the mold assembly of FIGS. 7 and 8;

FIG. 10 is a perspective view of a part of the mold assembly of FIGS. 7 and 8, especially illustrating projections;

EXAMPLE 1

Figure 1:
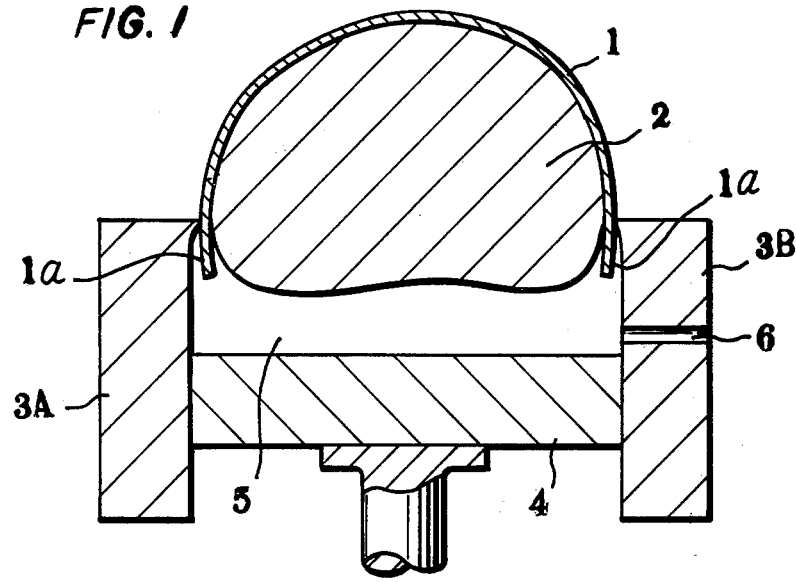
FIG. 1 is a cross section of a mold assembly for molding a sandal by the conventional method.
Figure 2:
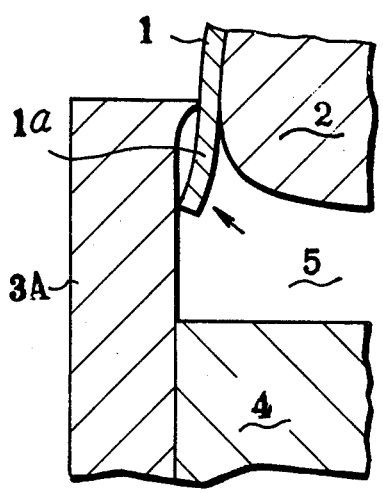
FIG. 2 is a partially enlarged view of the mold assembly of FIG. 1.
Figure 3:
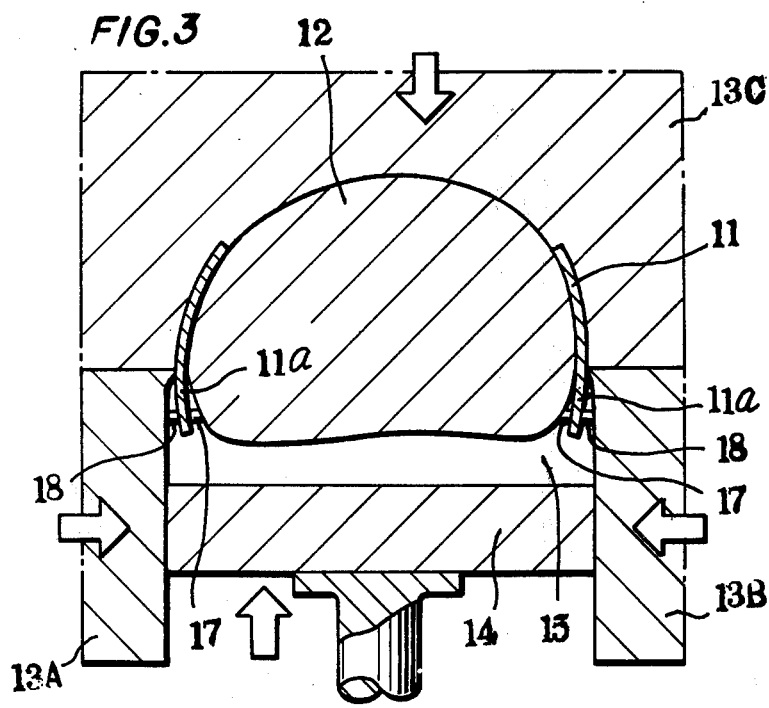
FIG. 3 is a cross section of mold assembly and an upper used in Example 1.
Figure 4:
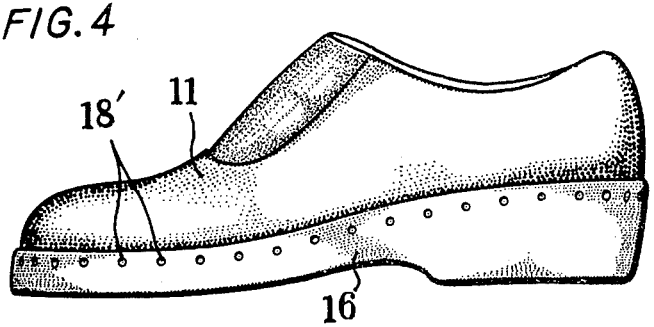
FIG. 4 is a side view of a shoe manufactured by means of the mold assembly of FIG. 3.

FIG. 3 illustrates molds for manufacturing a shoe as shown in FIG. 4. There are shown an upper 11 formed of synthetic leather, a male mold 12, divided female molds 13A–13C and a bottom mold 14, said divided female molds 13A–13C and said bottom mold 14 defining a molding cavity 15, while the said male mold 12 and divided female molds 13A–13C are provided integrally with a plurality of cylindrical projections 17 . . . , 18 . . . throughout the whole periphery of the sections of the shoe.

In manufacturing a shoe, firstly an upper 11 is mounted on the male mold 12, and then the female mold 13C is pressed on the male mold 12 at 100 kg/cm² clamping pressure. Then the bottom mold 14, the female molds 13A and 13B are set in place, thereby the sole molding cavity 15 being defined. The lower peripheral edge 11a of the upper 11 supported by the male mold 12 and the female mold 13c is protruded into the molding cavity 15 and securedly supported at the outer and inner surfaces thereof by a plurality of projections 17 . . . and 18 . . . . Each projection 17 has a cylindrical shape, extending integrally from the male mold 12 into the molding cavity 15 and being in contact with the inner surface of the lower peripheral edge 11a of the upper 11. Further, each projection 18 has a cylindrical shape similarly to the projection 17, extending integrally from the female molds 13A and 13B and being in contact with the outer surface of the lower peripheral edge 11a of the upper 11.

Then, sole molding material consisting of 100 parts of vinyl chloride resin, 70 parts of plasticizer (DOP), 0.5 part of smoothing agent (stearic acid), 4 parts of coloring agent and the like is injected under an injection pressure of about 60 kg/cm² for about 1 minute through an injection opening (not shown) into the molding cavity 15. In this case, the molds 12, 13A, 13B, 13C and 14 have a temperature of about 80° C. Then, the molds are cooled for about 30 seconds to about 50° C. By this cooling the molds, the material in the molding cavity 15 is hardened, whereby a sole 16 is formed and at the same time said sole 16 and the upper 11 are integrally connected. Thus a sport shoe as shown in FIG. 4 is obtained. By means of the projections 17 . . . and 18 . . . , through holes 19 . . . are formed in the peripheral edge of the sole 16, and the upper surface consealed in the sole is partly exposed through the said through holes to represent an openwork. By coloring the upper 11 and the sole 16 in contrast to each other, colorful decoration is provided in addition to said openwork.

If a through opening 11b is provided in the end portion 11a of the upper 11 protruded into the cavity, injected resin material on both sides of the end portion 11a are communicated through the opening 11b with each other, thereby ensuring the connection. FIG. 5(b) illustrates an embodiment in which projections 17 . . . and 18 . . . are not in contact with but suitably spaced from the end portion 11a. In this case, only recesses are formed in the molded sole and the surface of the end portion 11a are exposed.

EXAMPLE 2

Figure 6:
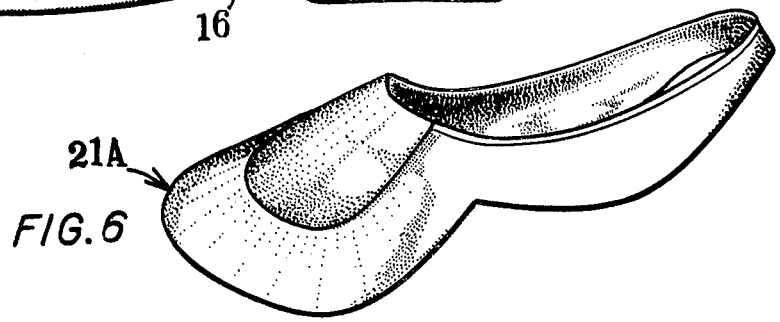
FIG. 6 is a side view of the upper of FIG. 2.

An upper vamp section 21A as shown in FIG. 6 is formed of synthetic resin. The lower peripheral edge of the upper vamp section 21A is adapted to be connected with a lateral side section having an insole which is to be provided later.

As shown in FIGS. 7 and 8, the upper vamp section 21 is mounted on a male mold 22 and then female molds 23A and 23B are pressed on the male mold 22 at a clamping pressure of about 90 kg/cm² while a bottom mold 24 is put in place, whereby a cavity 25 for molding an insole and a lateral side section is defined by the molds 22, 23A, 23B and 24. The lower peripheral edge of the upper vamp section 21A are protruded into the molding cavity 25 (especially the part thereof for molding a lateral side section), and supportedly secured in a predetermined position by a number of projections 27 . . . 28a . . . and 28b . . . extended from the male mold 22 and the female molds 23A and 23B into the molding cavity. The projections 27 . . . and 28a . . . have cylindrical shape of similar size. Each projection 28b has the same length with the projection 28a but a smaller diameter. Every two projections 28b, 28b are provided between projections 28a, 28a on the side of the female mold 23A and 23B as shown especially in FIG. 10. Further, the female molds 23A and 23B are provided with a linear projection 28c below the projections 28a . . . and 28b . . . .

Figure 11:
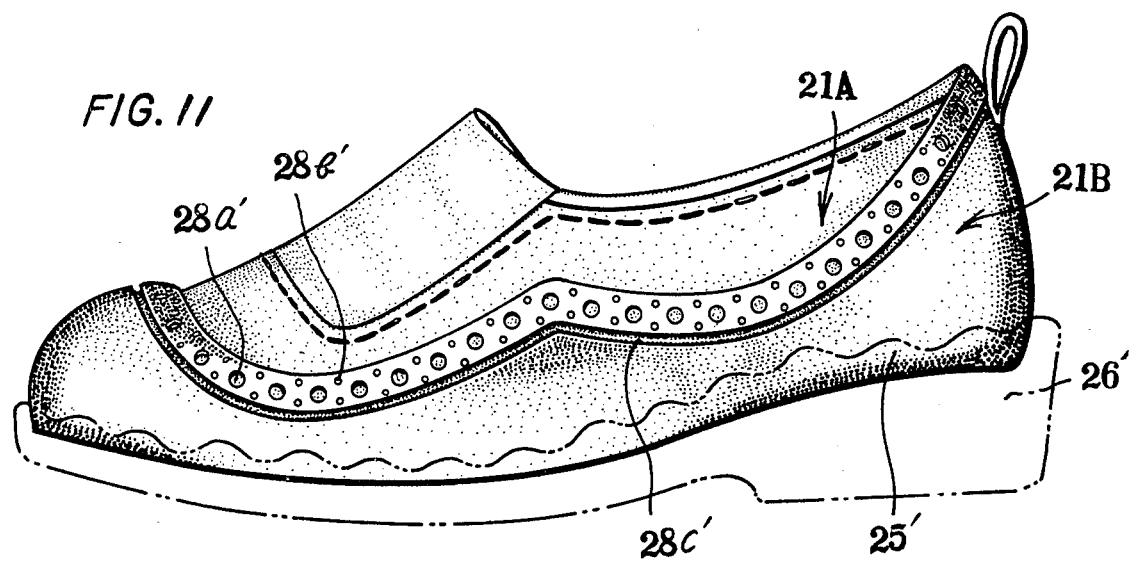
FIG. 11 is a side view of a shoe manufactured by means of the mold assembly of FIGS. 7 and 8.

After the upper vamp section 21 is put in place with respect to the molds as abovementioned, synthetic resin material of the similar composition to the sole molding material used in Example 1 is injected under an injecting pressure of about 70 kg/cm² for about 1 minute through an injection opening. In this case, the molds 22, 23A, 23B and 24 have a temperature of about 90° C. Then the molds are cooled for 40 seconds to about 50° C. Removing the molds, a shoe as shown in FIG. 11 is obtained. In the drawing are shown a lateral side section 21B connected to the lower peripheral edge 21a of the preformed upper vamp section 21A, and an insole 25 molded at the same time with the lateral side section 21B. Further, there are shown a number of through holes 28a'... and 28b'... formed by the linear projection 28c. The outer surface of the lower peripheral edge portion of the upper vamp section 21A is partly exposed through the through holes 28a'... and 28b'.... Ordinarily, such a shoe manufactured as above is further provided with a sole 26' as illustrated in FIG. 11 with an imaginary line. However, a preformed sole 26' may be connected to the insole 26 and the lower portion of the lateral side section 21B with an adhesive agent or by seaming. Otherwise, a sole may be molded by providing a sole molding cavity and at the same time the sole may be connected to an insole or a lateral side section.

Figure 12:
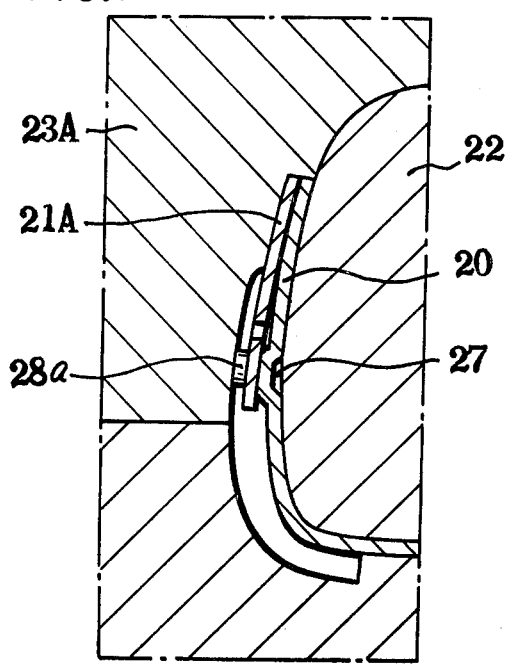
FIG. 12 is a partly sectional view of the mold assembly with a lining mounted thereon.

FIG. 12 illustrates an example in which synthetic leather lining 20 is mounted over the male mold 22 prior to disposing the upper vamp section 21A thereon. In this case, projections 27... of the male mold 22 are in contact through the lining 20 with the lower peripheral edge of the upper vamp section 21A.

Figure 15:
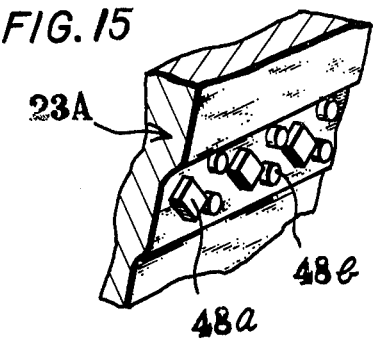
FIGS. 13, 15 and 16 are part perspective views illustrating modifications of projections.
Figure 16:
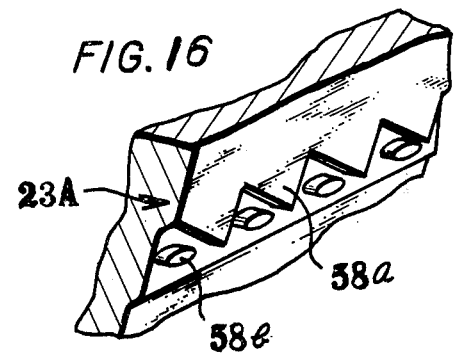
Figure 13:
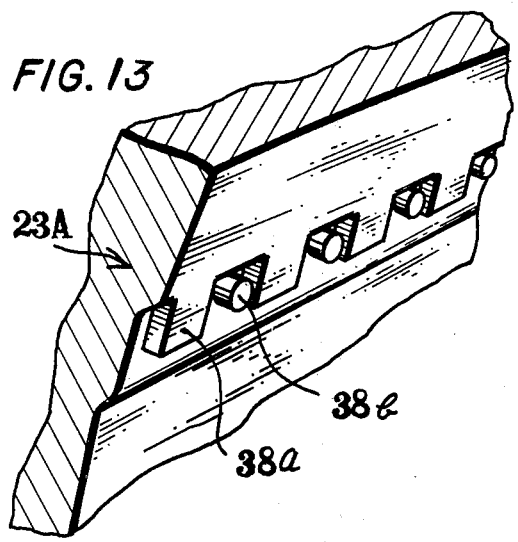
Figure 14:
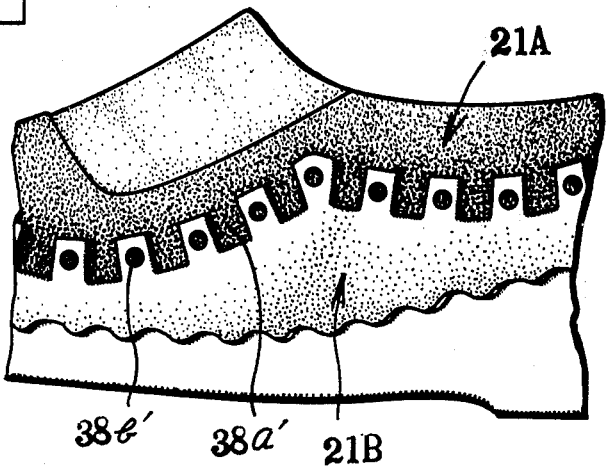
FIG. 14 is a side view of a part of a shoe manufactured by means of a mold assembly provided with projections as shown in FIG. 13.

FIG. 13 illustrates a modification of the projections in a mold as shown in FIG. 10, in which the female mold 23A is provided with rectangular and circular sectioned projections 38a... and 38b... arranged in an alternative succession. By using such a female mold, the connecting part between the upper vamp section 21A and the lateral side section 21B is provided with a pattern of a combination of sawtoothed line and circles formed by the through holes 38a'... and 38b'.... FIG. 15 illustrates an example in which the female mold 23A is provided with rhombic projections 48a... and circular projections 48b..., while FIG. 16 illustrates another example in which the female mold 23A is provided with a wave shaped projection 58a comprising a series of triangular projections and elliptical projections 58b....

EXAMPLE 3

Figure 17:
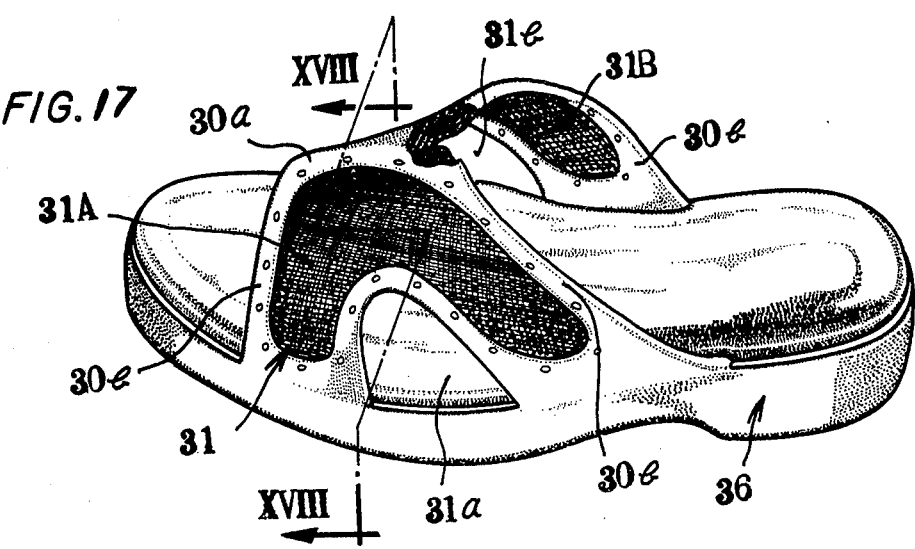
FIG. 17 is a perspective view of a sandal manufactured by the mold assembly used in Example 3.
Figure 18:
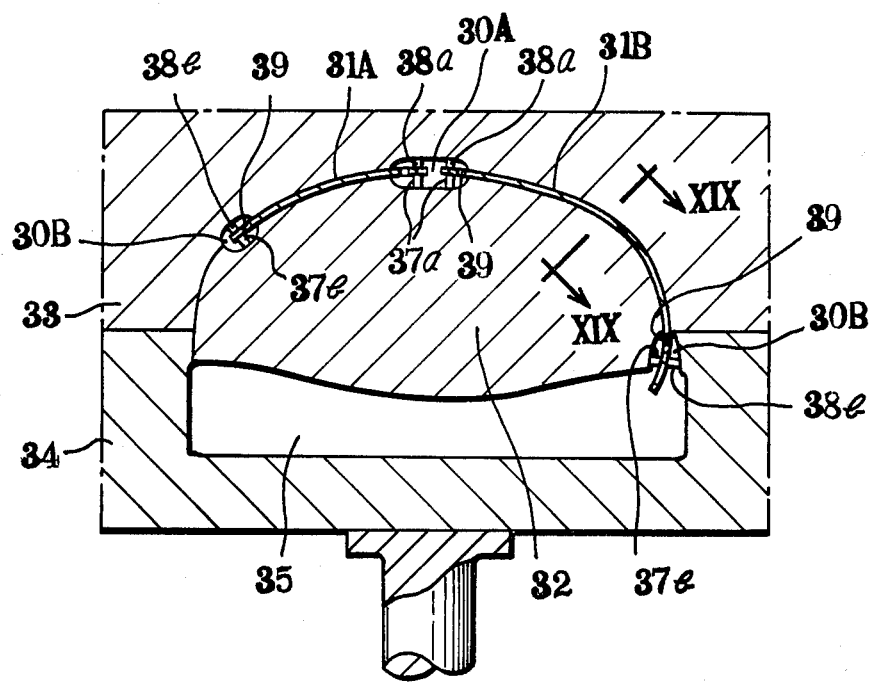
FIG. 18 is a lateral section of a mold assembly for manufacturing the sandal of FIG. 17 taken along the line XVI—XVI therein.
Figure 19:
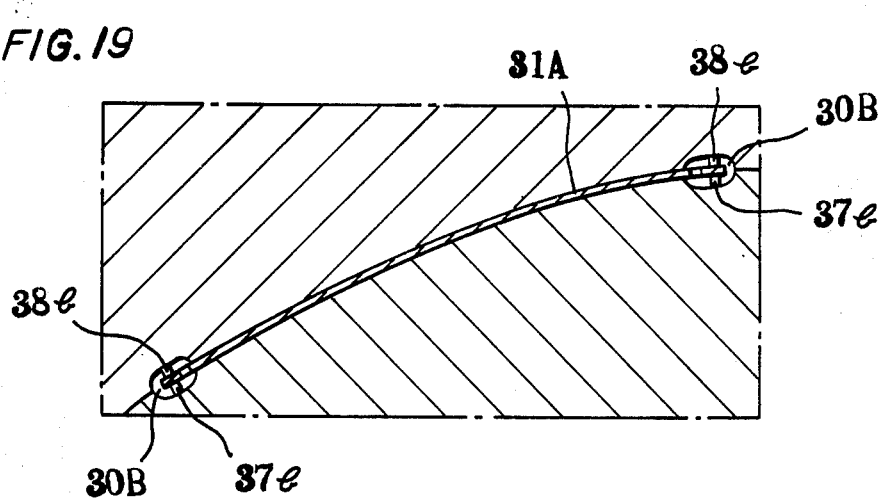
FIG. 19 is a section taken along the line V—V of FIG. 18.

FIG. 17 illustrates a sandal manufactured by molds as shown in FIG. 18. The sandal comprises a band 31 consisting of band section elements 31A and 31B and a sole 36. The band section elements 31A and 31B are provided with cut-away portions 31a and 31b respectively and formed of porous woven cloth, leather, synthetic resin material or the like, the two elements 31A and 31B being integrally connected together at their adjacent margins in the center of the band by means of a connecting member 30a. The other end of each band section element is embedded into the sole 36. Further, the peripheral portion of each band section element is covered with flange members 30b. In manufacturing the sandal, as shown in FIG. 18, firstly the band section elements 31A and 31B are mounted on the male mold 32, one end of each band section element being inserted into a molding cavity 30A for molding a connecting member and supported between and by the projections 38a..., 37a... integrally protruded from a divided female mole 33 and the male mold. The peripheral margin of each band section element is inserted into a molding cavity 30B for molding a flange member and supported between and by the projections 38b... and 37b.... The other end of each band section element is protruded from the flange member molding cavity 30B into the sole molding cavity 35, the said end being also supported by the projections 38b... and 37b.... Preferably, the ends of the band section elements protruded into the connecting member molding cavity 30A and the flange member molding cavity 30B are provided with through holes. After the band 31 is put in place in the molding cavity, the said connecting member molding cavity 30A, the flange member molding cavity 30B and the sole molding cavity 35 are filled by injection with synthetic resin material having a similar composition to that of the molding material used in Example 1. When the material is hardened, the band section elements 31A and 31B are connected with each other and at the same time the flange member is formed at the peripheral portion of the band section elements, the band 31 and the sole 36 being also integrally connected with each other.

As mentioned above, according to the present invention, sections forming a footwear can be connected with each other substantially without any defect and at the same time the connecting portions are provided with decrations through openwork effect, improving production effeciency and quality of a footwear and thereby affording to provide an economical and excellent footwear.

I claim:

1. In a method for manufacturing a footwear comprising the steps of placing in a mold assembly having male and female molds a preformed section of appropriate material forming a part of the footwear in such a manner that a portion of the preformed section is within a molding cavity for molding another section of the footwear, injecting molding material into the cavity to thereby integrally connect the preformed section with the molding material, the improvement comprising supporting a peripheral portion of the preformed material away from the molding surfaces of the male and female molds by a plurality of pairs of projections which extend outwardly from the surfaces of the male and female molds to provide a space between the peripheral portion of the preformed material and the molding surface of each of the male and female molds, each pair of projections being spaced from the other pairs of projections and including a first projection extending from the surface of the male mold and a second projection extending from the surface of the female mold and aligned with the first projection, whereby the molding material which is injected into the cavity forms a layer of mold material between the peripheral portion of the preformed material and each of the male and female molds to securely connect the preformed material to the molding material, and holes are formed in the mold material by the projections which extend from the outer surface of the mold material to the preformed material.

2. The method of claim 1 including the step of providing the peripheral portion of the preformed material with openings whereby the molding material flows through the openings to provide further securement between the preformed material and the molding material.

* * * * *